(12) United States Patent
Kakigahara

(10) Patent No.: US 8,511,719 B2
(45) Date of Patent: Aug. 20, 2013

(54) FLOW-PASSAGE CONNECTING DEVICE AND LIQUID EJECTING APPARATUS INCLUDING THE SAME

(75) Inventor: Yutaka Kakigahara, Kariya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 404 days.

(21) Appl. No.: 12/862,623

(22) Filed: Aug. 24, 2010

(65) Prior Publication Data

US 2011/0050815 A1    Mar. 3, 2011

(30) Foreign Application Priority Data

Aug. 28, 2009   (JP) ................................. 2009-198788

(51) Int. Cl.
*F16L 21/00*        (2006.01)

(52) U.S. Cl.
USPC ........................................ 285/231; 285/124.4

(58) Field of Classification Search
USPC ................... 285/124.3, 124.4, 231; 347/85, 347/32
See application file for complete search history.

(56) References Cited

U.S. PATENT DOCUMENTS

| 4,382,618 | A | * | 5/1983 | Grisebach | 285/124.4 |
| 4,757,331 | A | | 7/1988 | Mizusawa | |
| 5,359,357 | A | | 10/1994 | Takagi et al. | |
| 5,865,474 | A | * | 2/1999 | Takahashi | 285/124.4 |
| 5,883,647 | A | * | 3/1999 | Uchida | 347/32 |
| 6,217,164 | B1 | | 4/2001 | Hino | |
| 6,715,863 | B2 | * | 4/2004 | Shimizu | 347/85 |
| 6,758,548 | B2 | * | 7/2004 | Davis et al. | 347/32 |
| 2002/0044181 | A1 | * | 4/2002 | Suenaga et al. | 347/85 |
| 2003/0038865 | A1 | * | 2/2003 | Inamura | 347/85 |
| 2004/0239733 | A1 | * | 12/2004 | Hattori et al. | 347/85 |
| 2006/0232647 | A1 | | 10/2006 | Suzuki et al. | |
| 2010/0013895 | A1 | * | 1/2010 | Koizumi | 347/85 |

FOREIGN PATENT DOCUMENTS

| JP | S61-213159 A | 9/1986 |
| JP | H01-220793 A | 9/1989 |
| JP | H05-318761 A | 12/1993 |
| JP | H11-207987 A | 8/1999 |
| JP | 2000-198215 A | 7/2000 |
| JP | 2001-018412 A | 1/2001 |
| JP | 2003-001845 A | 1/2003 |
| JP | 2003-206421 A | 7/2003 |
| JP | 2004-268599 A | 9/2004 |
| JP | 2005-324545 A | 11/2005 |

OTHER PUBLICATIONS

Japan Patent Office, Notification of Reason for Refusal for Japanese Patent Application No. 2009-198788 (counterpart Japanese patent application), mailed Feb. 5, 2013.

* cited by examiner

*Primary Examiner* — David E Bochna
(74) *Attorney, Agent, or Firm* — Baker Botts L.L.P.

(57) ABSTRACT

A flow-passage connecting device for connecting flow passages of first and second members, including: a joint to be attached at one end to an end portion of the passage of the first member and to be connected at the other end to the passage of the second member, the joint having a hollow space through which a fluid flows; a joint support portion for supporting the joint when the joint is attached, such that a positional adjustment of the joint in a direction perpendicular to a joint attachment direction is permitted within a first position-adjust range; and a position-adjust-range limiting portion disposed distant from the end portion of the passage of the first member in a direction opposite to the attachment direction and configured to limit the positional adjustment of the joint in the perpendicular direction within a second position-adjust range smaller than the first range when the joint is attached.

19 Claims, 5 Drawing Sheets

US 8,511,719 B2

FLOW-PASSAGE CONNECTING DEVICE AND LIQUID EJECTING APPARATUS INCLUDING THE SAME

CROSS REFERENCE TO RELATED APPLICATION

The present application claims priority from Japanese Patent Application No. 2009-198788, which was filed on Aug. 28, 2009, the disclosure of which is herein incorporated by reference in its entirety.

BACKGROUND OF THE INVENTION

1. Field of the Invention

The present invention relates to a flow-passage connecting device configured to connect flow passages of respective two members and a liquid ejecting apparatus including such a flow-passage connecting device.

2. Discussion of Related Art

In an ink-jet printer as one example of a liquid ejecting apparatus, it is known to provide a flow-passage connecting device between two members such as an ink-jet head, a tank for storing ink to be supplied to the head, etc. The flow-passage connecting device includes a joint by which flow passages of the respective members are connected. In such a flow-passage connecting device, it is desirable that the center axis of the joint be adjustable for accommodating or absorbing dimensional errors relating to the device. To this end, there is known a technique of adjusting the center axis of the joint utilizing a clearance of a mount hole formed in a plate for holding the joint when the plate that holds the joint is mounted on the ink-jet printer, for instance,

SUMMARY OF THE INVENTION

In the technique described above, however, it is needed to adapt, to a movable range of the joint provided by the clearance, a size of an opening to which the joint is attached, namely, a size of an end portion of an ink passage. Accordingly, the size of the opening, namely, the size of the end portion of the ink passage, is inevitably increased in an instance where the clearance is merely enlarged for enabling the adjustment of the center axis of the joint, leading to an increase in the size of a portion that constitutes the opening and accordingly an increase in the size of the printer as a whole.

It is therefore an object of the invention to provide a flow-passage connecting device in which a size increase of an end portion of a flow passage to which a joint is attached, etc., is avoided and a liquid ejecting apparatus including such a flow-passage connecting device.

The above-indicated object may be attained according to a principle of the invention, which provides a flow-passage connecting device configured to connect a flow passage formed in a first member and a flow passage formed in a second member, comprising:

a joint which is configured to be attached at one end thereof to an end portion of the flow passage of the first member and to be connected at the other end thereof to the flow passage of the second member and which has a hollow space through which a fluid flows between the one end and the other end;

a joint support portion configured to support the joint when the joint is attached to the end portion of the flow passage of the first member, such that a positional adjustment of the joint in a direction perpendicular to a joint attachment direction in which the joint is attached to the end portion of the flow passage of the first member is permitted within a first position-adjust range; and a position-adjust-range limiting portion which is disposed distant from the end portion of the flow passage of the first member in a direction opposite to the joint attachment direction and which is configured to limit the positional adjustment of the joint in the direction perpendicular to the joint attachment direction within a second position-adjust range smaller than the first position-adjust range when the joint is attached.

The above-indicated object may also be attained according to a principle of the invention, which provides a liquid ejecting apparatus, comprising:

a flow-passage connecting device defined above; and a liquid ejecting head unit, as the first member, which is configured to eject, to a medium, a liquid supplied from the second member through the flow-passage connecting device.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which:

FIGS. 4A and 4B are views for explaining a procedure of attaching joints to a head, FIG. 4A showing a state immediately before the joints held by a retain plate and an adjustment plate are inserted into respective through-holes of a limit plate while FIG. 4B shows a state immediately before the joints are attached to respective openings of the head.

DETAILED DESCRIPTION OF THE EMBODIMENTS

There will be hereinafter described embodiments of the invention with reference to the drawings.

Figure 1:
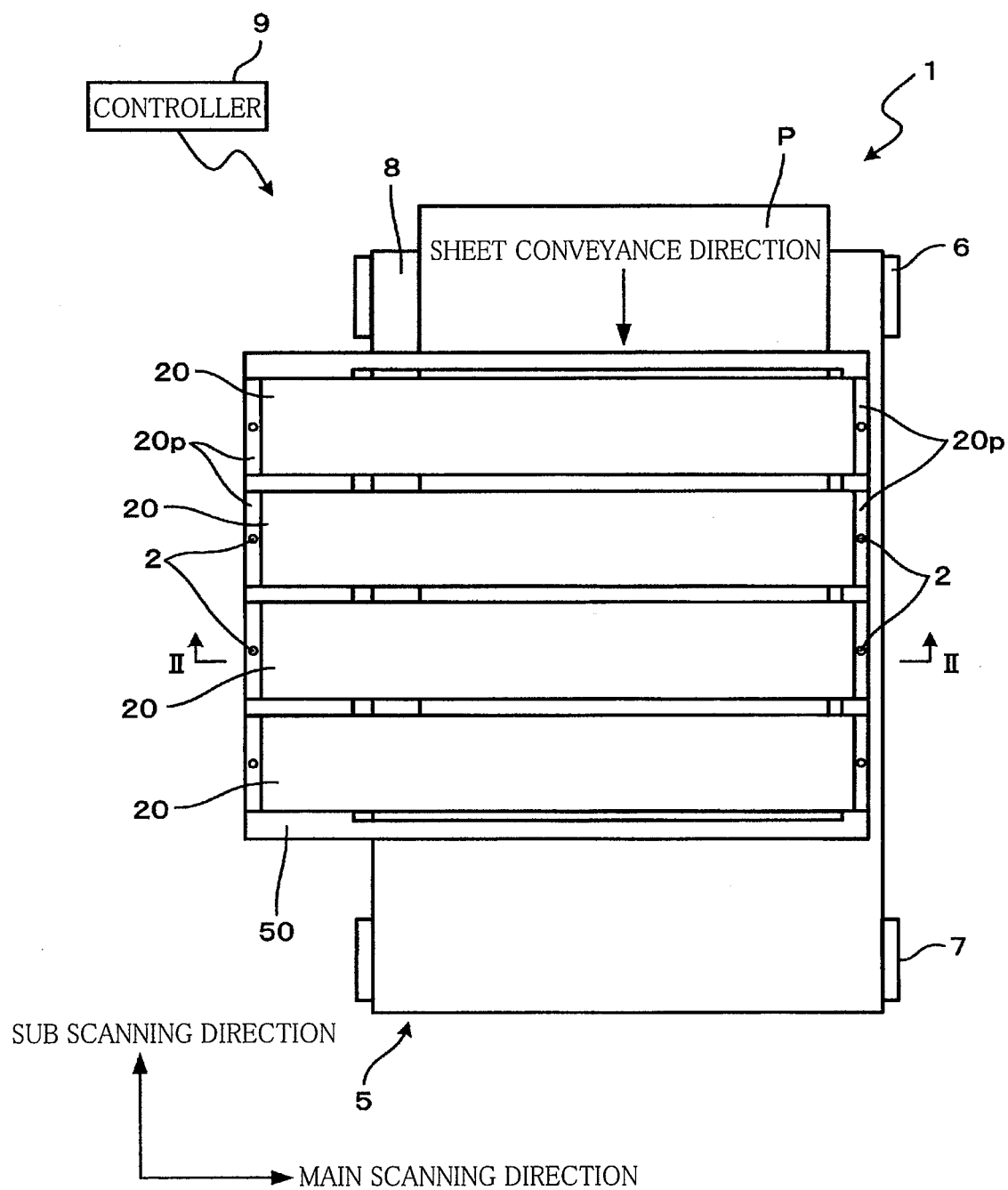
FIG. 1 is a plan view schematically showing an ink-jet printer as a liquid ejecting apparatus according to one embodiment of the invention.

Referring first to FIG. 1, there will be explained a schematic structure of an ink-jet printer indicated at 1 in FIG. 1 as a liquid ejecting apparatus according to one embodiment of the invention.

Figure 2:
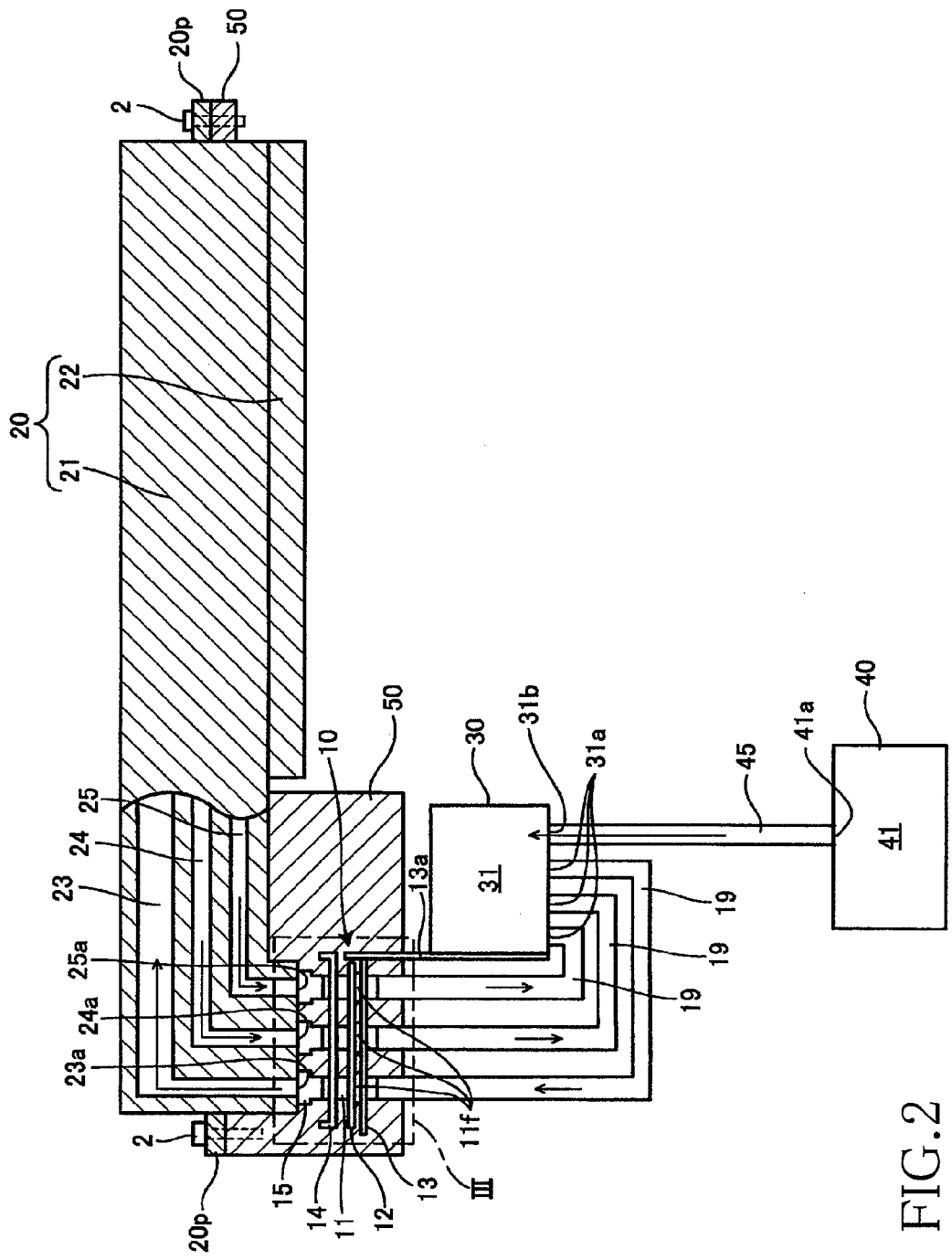
FIG. 2 is a partial cross-sectional view of a flow-passage connecting device according to one embodiment of the invention, the view being taken along line II-II in FIG. 1.

As shown in FIG. 1, the ink-jet printer 1 includes a sheet conveyor unit 5 for conveying a sheet P along a sub scanning direction, four ink-jet heads 20 for ejecting droplets of a magenta ink, a cyan ink, a yellow ink, and a black ink, respectively, on the sheet P conveyed by the sheet conveyor unit 5, ink supply systems provided for the respective four ink-jet heads 20, and a controller 9 for controlling various portions of the printer 1. Each ink supply system includes a sub tank 30, a main tank 40, etc., as shown in FIG. 2. A flow-passage connecting device 10 (FIG. 2) according to one embodiment of the invention is provided for each of the ink supply systems. Each flow-passage connecting device 10 is utilized for connecting passages of a corresponding one of the heads 20 (each as a first member) and passages of the sub tank 30 (as a second member) of a corresponding one of the ink supply systems. The details of each ink supply system including the flow-passage connecting device 10 will be explained with reference to FIG. 2.

The sheet conveyor unit 5 includes two belt rollers 6, 7 disposed so as to be spaced apart from each other in the sub scanning direction with the four heads 20 interposed therebetween and an endless conveyor belt 8 wound around the two rollers 6, 7 so as to be stretched therebetween. The belt roller 7 is a drive roller configured to rotate by a drive force transmitted from a conveyance motor (not shown) that is driven under the control of the controller 9. The belt roller 6 is a driven roller configured to rotate by the movement of the conveyor belt 8 in accordance with the rotation of the belt roller 7. The sheet P is conveyed in a sheet conveyance direction shown in FIG. 1 in a state in which the sheet P is placed on an outer surface of an upper loop portion of the conveyor belt 8.

Each of the four ink-jet heads 20 extends in a main scanning direction which is orthogonal to the sub scanning direction and is parallel to the upper surface of the sheet that is being conveyed. The four ink-jet heads 20 are arranged in parallel with each other so as to be spaced apart from each other by a suitable distance in the sub scanning direction. A multiplicity of ejection openings (not shown) through which ink droplets are ejected are open in the lower surface of each head 20. That is, the ink-jet printer 1 is a line-type color ink-jet printer wherein the multiplicity of ejection openings are arranged in the main scanning direction.

The outer surface of the upper loop portion of the conveyor belt 8 is opposed to the lower surface of each head 20 with a slight clearance therebetween so as to be parallel to the lower surface. When the sheet P conveyed on the conveyor belt 8 passes right below the four ink-jet heads 20, the ink droplets of mutually different colors are ejected in order from the respective ink-jet heads 20 to the upper surface of the sheet P, so that a desired color image is formed on the sheet P.

Figure 3:
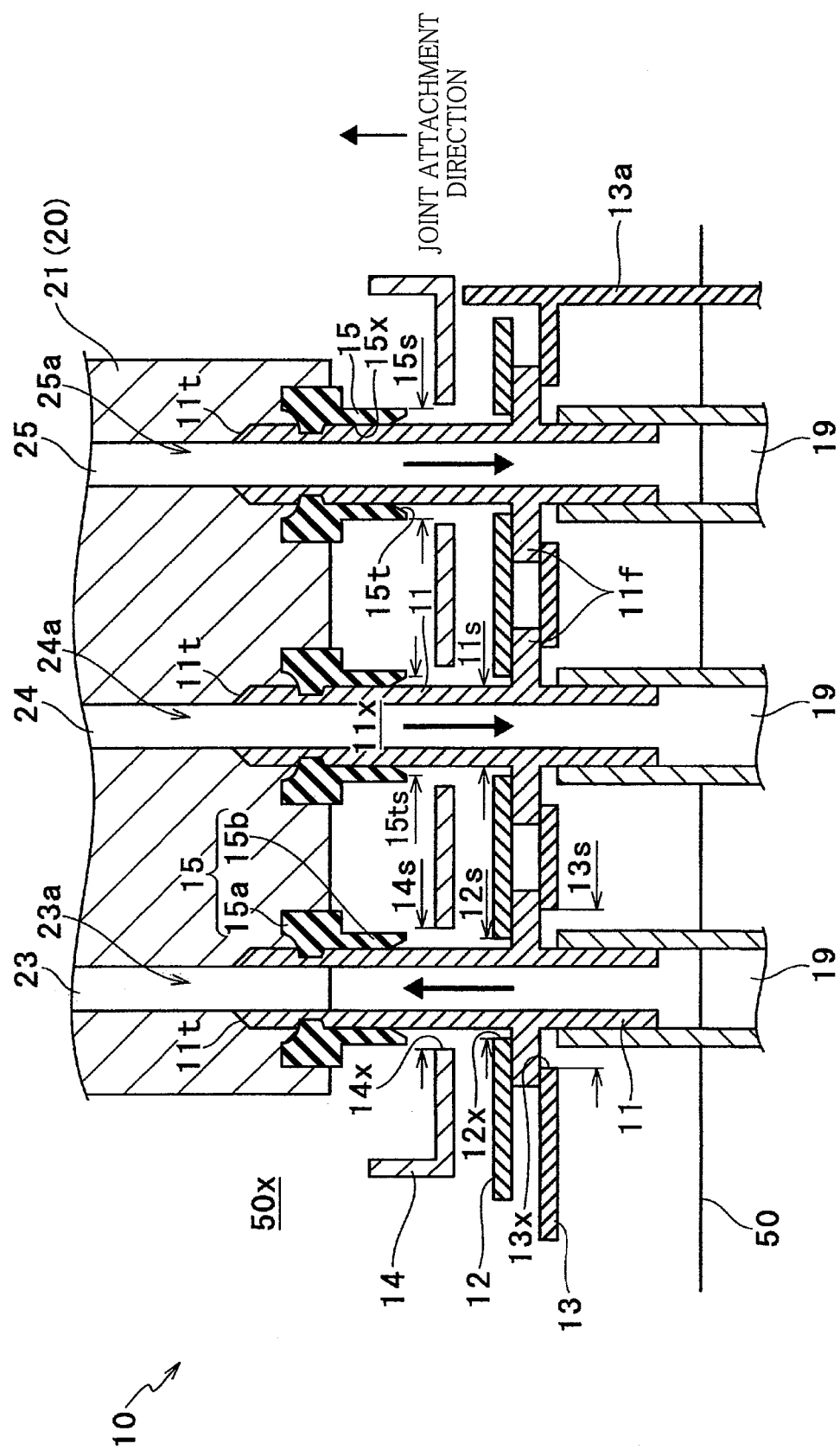
FIG. 3 is an enlarged cross-sectional view of a region III enclosed by one-dot chain line in FIG. 2.

Each head 20 includes protruding portions 20p that protrude from respective opposite ends of the head 20 in the main scanning direction. The head 20 is fixed to a frame 50 as a base member having a rectangular shape in plan view shown in FIG. 1, through fixing members such as bolts 2 each inserted into a substantially central part of a corresponding one of the protruding portions 20p. The frame 50 is fixedly disposed at a predetermined position in the printer 1. One side of the frame 50 along the sub scanning direction, namely, the left side of the frame 50 in FIG. 1, has a width larger than the other three sides, and the portion of the frame 50 corresponding to the left side has a thickness larger than the other portions of the frame 50. As shown in FIG. 3, there are disposed, in a recess 50x of the frame 50 formed at the portion thereof corresponding to the left side, one end portion of each head 20 in the main scanning direction (i.e., the left end portion of each head 20 in FIG. 1) and the flow-passage connecting devices 10 corresponding to the respective heads 20.

Referring next to FIG. 2, there will be explained a structure of each of the heads 20 and each of the ink supply systems including the respective flow-passage connecting devices 10. While, in FIG. 2, one ink supply system corresponding to one of the four heads 20 is shown, the ink supply system shown in FIG. 2 is provided for each of the four heads 20. Further, in FIG. 2, ink passages in the head 20 are partially shown in cross section, and other portions are shown in simplified cross section or in side view, for clarification of the structure.

As shown in FIG. 2, the head 20 includes a reservoir unit 21 and a flow-passage unit 22 fixed to the underside of the reservoir unit 21. As shown in FIG. 2, in the reservoir unit 21, there are formed ink passages such as an inflow passage 23, a first discharge passage 24, a second discharge passage 25, and an ink reservoir (not shown) which is in communication with the passages 23-25 and which temporarily stores ink. On the lower surface of the reservoir unit 21 at one of its opposite ends in the main scanning direction, namely, at the left end of the reservoir unit 21 in FIG. 1, there are formed three openings 23a, 24a, 25a which are an end portion of the inflow passage 23, an end portion of the first discharge passage 24, and an end portion of the second discharge passage 25, respectively. The ink supplied into the reservoir unit 21 from the sub tank 30 via the opening 23a passes through the inflow passage 23 and is temporarily stored in the ink reservoir. Then the ink is suitably supplied to the flow-passage unit 22. The flow-passage unit 22 has a multiplicity of ejection openings (not shown) formed in its lower surface. In the flow-passage unit 22, there are formed: a common ink passage that is common to the ejection openings; and individual ink channels for the respective ejection openings. The ink supplied from the reservoir unit 21 to the flow-passage unit 22 is distributed into the respective individual ink channels via the common ink passage and is finally ejected from the ejection openings in accordance with deformation of an actuator (not shown) driven under the control of the controller 9. In an instance where air bubbles and the like in the reservoir unit 21 need to be discharged, the ink in the sub tank 30 is flowed into the ink reservoir via the inflow passage 23 and is subsequently flowed back into the sub tank 30 from the ink reservoir via the first discharge passage 24 or the second discharge passage 25. In each of the passages 23-25, a check valve (not shown) is provided for allowing the ink flow only in a direction indicated by the arrow (FIG. 2) in each passage 23-25.

The sub tank 30 includes: a casing that defines a storage chamber 31 for storing the ink; and three openings 31a and one opening 31b formed in the lower surface of the casing. Each of the openings 31a, 31b corresponds to an end portion of the storage chamber 31 as a flow passage in the sub tank 30. The storage chamber 31 communicates with an inner space in each of elastic tubes 19 (that will be explained) via a corresponding one of the three openings 31a and communicates with an inner space in a pipe 45 via the opening 31b.

The main tank 40 includes a casing that defines a storage chamber 41 for storing the ink and an opening 41a formed in the upper surface of the casing. The storage chamber 41 communicates with the storage chamber 31 of the sub tank 30 via the pipe 45 which connects the opening 31b and the opening 41a, and the ink in the storage chamber 41 is suitably supplied to the storage chamber 31 via the pipe 45. The main tank 40 is attachable to and detachable from a casing of the printer 1 and is replaced with a new one by a user when the ink in the main tank 40 is used up, for instance.

The flow-passage connecting device 10 is for connecting the passages 23-25 in the head 20 and the storage chamber 31 of the sub tank 30. The flow-passage connecting device 10 includes: three seal members 15 respectively attached to the openings 23a-25a located at the end portions of the respective passages 23-25; three joints 11 which correspond to the respective three openings 23a-25a; a retain plate or portion 12 configured to regulate a relative positional relationship among the three joints 11 in a horizontal direction, i.e., in a direction orthogonal to the sheet plane in FIG. 2, when the joints 11 are attached to the respective openings 23a-25a; an adjustment plate or portion 13 configured to support the joints 11 while enabling a positional adjustment of each joint 11 in the horizontal direction, when the joints 11 are attached to the respective openings 23a-25a; a limit plate or portion 14 configured to limit a range of the positional adjustment (position-adjust range) of each joint 11 so as to be smaller than a range of the positional adjustment of each joint 11 in the horizontal direction by the adjustment plate 13 while enabling the positional adjustment of each joint 11 in the horizontal direction, when the joints 11 are attached; and the three elastic tubes 19 which respectively connect the lower ends of the respective joints 11 and the openings 31a formed in the lower surface of the sub tank 30. Here, the horizontal direction is a direction parallel to the horizontal plane. In the present embodiment, the horizontal direction is a direction perpendicular to a direction in which each joint 11 is attached to a corresponding one of the openings 23a-25a. In this respect, the direction in which the joints 11 are attached to the respective openings 23a-25a of the head 20 (hereinafter referred to as the "joint attachment direction" where appropriate) is an upward direction in FIG. 3 as indicated by the arrow in FIG. 3. Moreover, the upper side in FIG. 3 may be referred to as an anterior or downstream side in the joint attachment direction and the lower side in FIG. 3 may be referred to as a posterior or upstream side in the joint attachment direction.

Referring next to FIG. 3, the structure of various portions of the flow-passage connecting device 10 will be explained in detail. FIG. 3 shows the portions of the flow-passage connecting device 10 in cross section along the center axes of the joints 11.

As shown in FIG. 3, each joint 11 is a cylindrical member extending in the vertical direction and having a hollow space 11x through which ink flows between the upper end and the lower end of the joint 11. The upper ends of the respective joints 11 are attached to the respective openings 23a-25a of the head 20 via the respective seal members 15 while the lower ends of the respective joints 11 are connected to the respective openings 31a (FIG. 2) of the sub tank 30 via the respective elastic tubes 19.

Each joint 11 has a taper 11t around the periphery of the upper end thereof formed by cutting out an outer circumferential portion of the cylindrical wall of the joint 11 at the upper end. Accordingly, the upper end of each joint 11 is tapered and inclined such that the diameter of the joint 11 at the upper end gradually decreases in the joint attachment direction, i.e., in the upward direction in FIG. 3.

Each of the passages 23-25 of the head 20 has, at the vertical portion thereof above the corresponding opening 23a-25a, a diameter substantially the same as the hollow space 11x of each joint 11 and has, in the vicinity of the corresponding opening 23a-25a, an enlarged diameter that corresponds to an outside diameter or dimension 11S of the joint 11. Each seal member 15 is fitted to a portion of the corresponding passage 23-25 having the enlarged diameter in the vicinity of the corresponding opening 23a-25a.

Each seal member 15 is formed of an elastic material such as rubber and includes a base portion 15a fitted in the corresponding opening 23a-25a and an extending portion 15b which extends downward from the base portion 15a and which has an outside diameter smaller than that of the base portion 15a. Each seal member 15 has a through-hole 15x formed through the base portion 15a and the extending portion 15b so as to extend in the vertical direction. A diameter of the inner circumference of the extending portion 15b that partially defines the through-hole 15x is made slightly smaller than the outside diameter 11S of each joint 11 so as to permit the joint 11 to be suitably held by the seal member 15 owing to its elastic force. The base portion 15a of each seal member 15 has a radially inwardly protruding portion on its inner circumference that partially defines the through-hole 15x, so as to permit the joint 11 to be firmly fixed to the head 20.

Owing to the seal members 15, the joints 11 are firmly fixed to the head 20 and the ink can be prevented from leaking from the openings 23a-25a of the head 20.

Each seal member 15 has a taper 15t around the entire periphery of the lower end of its extending portion 15b. While the cylindrical wall of the extending portion 15b has a substantially constant thickness, an inner circumferential portion of the cylindrical wall of the extending portion 15b at the lower end is cut out, whereby the taper 15t is formed. The taper 15t of each seal member 15 is inclined such that the diameter of the through-hole 15x gradually decreases in a direction from the lower end of the extending portion 15b toward the upper side in FIG. 3, namely, gradually decreases in the joint attachment direction. In other words, the taper 15t is inclined in an inward direction at the lower end of the extending portion 15b so as to narrow the corresponding passage 23-25. Each taper 15t is for guiding the joint 11 into the corresponding opening 23a-25a of the head 20 while enabling the positional adjustment of the joint 11 in the horizontal direction when the joint 11 is attached to the corresponding opening 23a-25a.

Each joint 11 has a flange 11f horizontally extending from its outer circumferential surface at a position thereof distant from the lower end of the joint 11 by a distance corresponding to one third of the length of the joint 11. The flange 11f is formed over the entire circumference on the outer circumferential surface of the joint 11. The retain plate 12 and the adjustment plate 13 are disposed on the upper side and the lower side of the flange 11f, respectively.

The retain plate 12, the adjustment plate 13, and the limit plate 14 are plate members extending in the horizontal direction and have three circular through-holes 12x, three circular through-holes 13x, and three circular through-holes 14x, respectively, through which the three joints 11 are inserted.

A diameter 12S of each through-hole 12x formed in the retain plate 12 is smaller than a diameter 13S of each through-hole 13x formed in the adjustment plate 13 and a diameter 14S of each through-hole 14x formed in the limit plate 14 and is slightly larger than the outside diameter 11S of the joint 11. The retain plate 12 is held on the upper surfaces of the flanges 11f of the respective three joints 11 inserted through the respective three through-holes 12x, and is not fixed relative to the frame 50. Accordingly, when the three joints 11 are attached to the respective openings 23a-25a, the three joints 11 are slightly movable in the horizontal direction within the respective through-holes 12x, but the relative positional relationship among the three joints 11 in the horizontal direction can be maintained to a certain degree by the retain plate 12. That is, the retain plate 12 does not completely fix the relative positional relationship among the three joints 11 in the horizontal direction, but maintains the relative positional relationship while allowing the three joints 11 to be slightly movable relative to each other in the horizontal direction to a given degree corresponding to a tolerance, for instance.

The diameter 13S of each through-hole 13x formed in the adjustment plate 13 is larger than the diameter 12S of each through-hole 12x formed in the retain plate 12 and the diameter 14S of each through-hole 14x formed in the limit plate 14 and is smaller than an outside diameter of the flange 11f of each joint 11. The three joints 11 are held on the upper surface of the adjustment plate 13 at portions thereof each in the vicinity of the periphery of the through-hole 13x. When the three joints 11 are attached to the respective openings 23-25a, the three joints 11 are allowed to be largely movable in the horizontal direction within the respective through-holes 13x of the adjustment plate 13 while the relative positional relationship among the three joints 11 in the horizontal direction is maintained by the retain plate 12 to the certain degree.

The retain plate 12 is merely supported on the flanges 11f of the joints 11 without being fixed to the frame 50 whereas the adjustment plate 13 is fixed to the frame 50 and is fixed to a vertical plate 13a at its one end, i.e., at its right-side end in FIG. 3, in the state shown in FIG. 3. The vertical plate 13a is fixed to the outer surface of one side wall of the sub tank 30, as shown in FIG. 2.

The diameter 14S of each through-hole 14x formed in the limit plate 14 is larger than the diameter 12S of each through-hole 12x formed in the retain plate 12, smaller than the diameter 13S of each through-hole 13x formed in the adjustment plate 13, and larger than an outside diameter 15S of the extending portion 15b of each seal member 15. When the three joints 11 are attached to the respective openings 23a-25a of the head 20, the limit plate 14 is located nearer to the openings 23a-25a of the head 20 as compared with the retain plate 12 and the adjustment plate 13 and is disposed distant from the openings 23a-25a of the head 20 in a direction opposite to the joint attachment direction, as shown in FIG. 3. As will be explained with reference to FIG. 4A, the limit plate 14 is fixed to the frame 50 in advance before the joints 11 are inserted into the respective through-holes 14x with the flanges 11f thereof sandwiched between the retain plate 12 and the adjustment plate 13.

Each elastic tube 19 is formed of an elastic material such as rubber and has a hollow space through which the ink flows between one and the other ends of the elastic tube 19. The one end of the elastic tube 19 is connected to the lower end of the corresponding joint 11 while the other end is connected to the corresponding opening 31a of the sub tank 30 as shown in FIG. 2. The ink in the storage chamber 31 of the sub tank 30 initially passes through the elastic tubes 19, subsequently through the hollow spaces 11x the joints 11, and is finally supplied to the head 20.

Figure 4A:
Figure 4A:
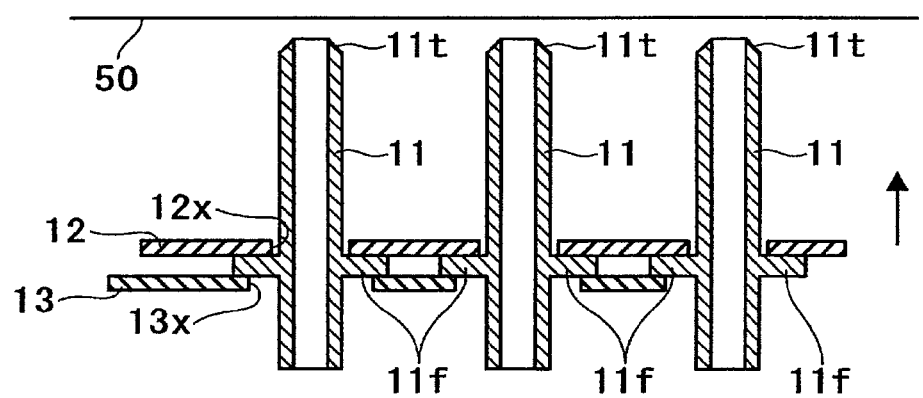
Figure 4B:
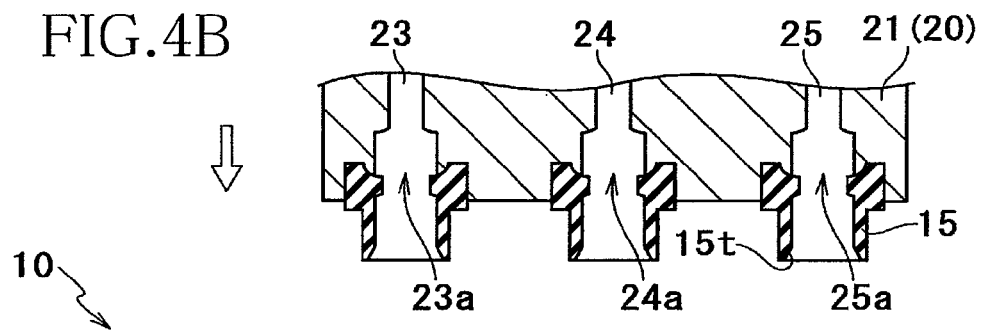
Figure 4B:
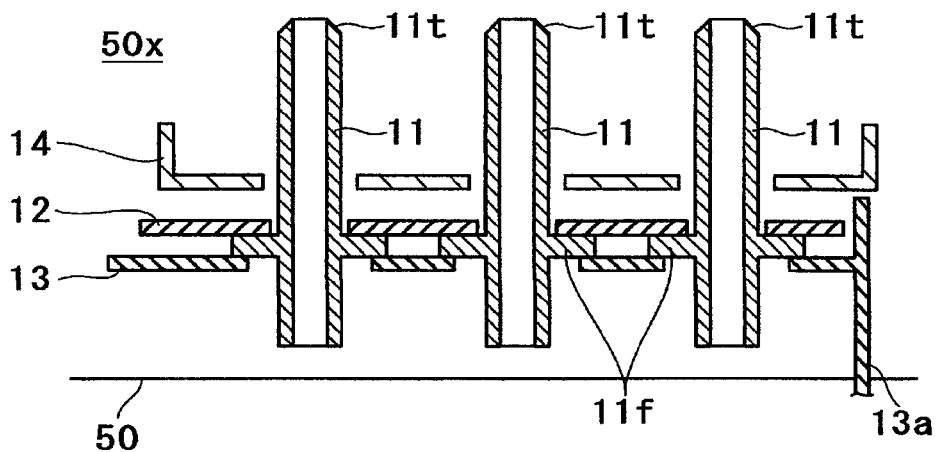

Referring next to FIGS. 4A and 4B, there will be explained a procedure of attaching the joints 11 to the respective openings 23a-25a of the head 20.

Initially, the three joints 11 are inserted into the respective through-holes 13x of the adjustment plate 13 such that the lower ends of the joints 11 first pass through the through-holes 13x, and the flanges 11f are placed on the upper surface of the adjustment plate 13. The three joints 11 thus held by the adjustment plate 13 are then inserted into the respective through-holes 12x of the retain late 12, and the retain plate 12 is held on the flanges 11f of the joints 11. Thus, the flanges 11f of the respective joints 11 are sandwiched by and between the retain plate 12 and the adjustment plate 13, as shown in FIG. 4A. On this occasion, the three joints 11 are movable by a large distance in the horizontal direction within the respective through-holes 13x of the adjustment plate 13, together with the retain plate 12 while the relative positional relationship among the three joints 11 in the horizontal direction is maintained by being inserted into the respective through-holes 12x of the retain plate 12.

Subsequently, on the lower side of the limit plate 14 that is fixed in advance to the frame 50 at a predetermined position of the frame 50, the retain plate 12 and the adjustment plate 13 are moved upward with the flanges 11f of the three joints 11 sandwiched therebetween, and the three joints 11 are inserted into the respective through-holes 14x of the limit plate 14 substantially at the same time, such that the upper ends of the joints 11 first pass through the through-holes 14x. On this occasion, though a movable range of the three joints 11, the retain plate 12, and the adjustment plate 13 is limited in accordance with the size and the location of the through-holes 14x of the limit plate 14, the joints 11, the retain plate 12, and the adjustment plate 13 are movable in the horizontal direction. The three joints 11 are inserted into the respective through-holes 14x while the position of each joint 11 is adjusted in the horizontal direction relative to the corresponding through-hole 14x, together with the retain plate 12 and the adjustment plate 13. At this stage, the adjustment plate 13 is not yet fixed to the vertical plate 13a.

After the joints 11 have been inserted into the respective through-holes 14x of the limit plate 14 as described above, the adjustment plate 13 is fixed to the frame 50 at a predetermined position of the frame 50. Then the sub tank 30 is disposed at a predetermined position in the printer 1. After the vertical plate 13a has been fixed to the outer surface of the side wall of the sub tank 30, the adjustment plate 13 is fixed at one end thereof to the vertical plate 13a, as shown in FIG. 2. The adjustment plate 13 is thus fixed to the frame 50 at this stage whereas the retain plate 12 and the joints 11 held by the retain plate 12 are not fixed with respect to the frame 50. Accordingly, when the joints 11 are attached to the respective openings 23a-25a of the head 20, the joints 11 are movable in the horizontal direction, together with the retain plate 12, within the respective through-holes 14x of the limit plate 14 having a smaller size than that of the through-holes 13x of the adjustment plate 13, as explained below.

Thereafter, the head 20 is disposed over the joints 11 with the openings 23a-25a of the head 20 and the joints 11 positioned relative to one another, as shown in FIG. 4B. Then the head 20 is moved downward, and the joints 11 are inserted into the respective openings 23a-25a of the head 20 while the positions of the joints 11 that are movable in the horizontal direction within the respective through-holes 14x of the limit plate 14 are adjusted in the horizontal direction. On this occasion, each of the joints 11 is guided into a corresponding one of the openings 23a-25a by the taper 15t of a corresponding one of the seal members 15 attached to the respective openings 23a-25a, such that the upper end of the joint 11 is first inserted into the corresponding opening 23a-25a. Thus, the joints 11 are attached to the respective openings 23a-25a, and the head 20 is fixed with respect to the frame 50.

Subsequently, one and the other ends of each elastic tube 19 are attached to the lower end of a corresponding one of the three joints 11 and a corresponding one of the openings 31a of the sub tank 30, respectively, as shown in FIG. 2. Thus, there are formed passages from the sub tank 30 to the head 20 via the elastic tubes 19 and the joints 11.

As explained above, in the flow-passage connecting device 10 according to the present embodiment, the positions of the joints 11 in the horizontal direction can be adjusted by the adjustment plate 13 when the joints 11 are attached, whereby it is possible to accommodate errors in the dimensions and the locations of the portions of the flow-passage connecting device 10 with respect to the horizontal direction, such as the diameter of each joint 11 and the location of the center of each joint 11. Further, the position-adjust range of each joint 11 is limited by the limit plate 14 to a smaller range than a range by the adjustment plate 13, thereby minimizing the size of the openings 23a-25a to which the respective joints 11 are attached and the size of a portion of the head 20 at which the openings 23a-25a are formed, namely, the size of the lower surface of the head 20 in which the openings 23a-25a are formed as shown in FIG. 2, in the present embodiment. In other words, in the flow-passage connecting device 10 according to the present embodiment, it is possible to avoid the size increase of the openings 23a-25a to which the joints 11 are respectively attached and the size increase of the portion of the head 20 at which the openings 23a-25a are formed while accommodating the errors in the dimensions and the locations of various portions that relate to the connection of the flow passages.

In the printer 1 according to the present embodiment, the object to which the joints 11 are attached is the head 20, and the size of the openings 23a-25a to which the joints 11 are attached and the size of the portion of the head 20 at which the openings 23a-25a are formed can be reduced. Hence, the head 20 can be downsized and the printer 1 as a whole can be accordingly downsized. Further, the downsizing of the head 20 ensures an effect of improving the replacement workability of the head 20.

Where the taper 15t for guiding the joint 11 is formed at each of the openings 23a-25a to which the respective joints 11 are attached as in the present embodiment, the length of the taper 15t as measured in the joint attachment direction tends to be increased in accordance with the position-adjust range of each joint 11. In the flow-passage connecting device 10 according to the present embodiment, however, the position-adjust range of each joint 11 can be limited so as to become smaller by the limit plate 14, whereby the length of the taper 15t in the joint attachment direction can be decreased, thereby enabling the size of the taper 15t to be reduced.

Since the errors in the dimensions and the locations of various portions that relate to the connection of the flow passages can be accommodated by the adjustment plate 13, the ease of the attachment of the joints 11 can be improved and various portions such as the joints 11, portions of the head 20 around the respective openings 23a-25a, and the seal members 15 can be prevented from undergoing an undesirable load when and after the joints 11 are attached. For instance, because the seal members 15 are less likely to suffer from an undesirable load, deterioration and deformation of the seal members 15 can be restrained, whereby ink leakage is prevented with high reliability. Accordingly, the passages can be connected with high reliability by the flow-passage connecting device 10.

As shown in FIG. 3, the limit plate 14 is a plate member which extends in the direction perpendicular to the joint attachment direction and in which are formed the through-holes 14x through which the joints 11 are respectively inserted. The thus structured limit plate 14 has a reduced thickness or size as measured in the joint attachment direction and the entirety of the flow-passage connecting device 10 including the limit plate 14 can be accordingly downsized.

In the flow-passage connecting device 10, the adjustment plate 13 and the limit plate 14 are disposed in this order from the posterior side of the joint attachment direction. In other words, the adjustment plate 13 and the limit plate 14 are disposed such that the adjustment plate 13 is distant from the head 20 by a distance larger than a distance by which the limit plate 14 is distant from the head 20, namely, the limit plate 14 is located intermediate between the head 20 and the adjustment plate 13. The adjustment plate 13 functions as a joint support portion for supporting the joints 11 when the joints 11 are attached to the respective openings 23a-25a, such that the positional adjustment of each joint 11 in the direction perpendicular to the joint attachment direction is allowed. The limit plate 14 functions as a position-adjust-range limiting portion for limiting the range of the positional adjustment (the position-adjust range) of each joint 11 in the direction perpendicular to the joint attachment direction, when the joints 11 are attached. The position-adjust range by the adjustment plate 13, i.e., a first position-adjust range, coincides with a difference between the diameter 13S (the inside dimension) of each through-hole 13x formed in the adjustment plate 13 and the outside diameter 11S (the outside dimension) of each joint 11, strictly, the outside diameter of a portion of the joint 11 except the flange 11f. The position-adjust range by the limit plate 14, i.e., a second position-adjust range, coincides with a difference between the diameter 14S (the inside dimension) of each through-hole 14x formed in the limit plate 14 and the outside diameter 11S of each joint 11. The second position-adjust-range limited by the limit plate 14 is made smaller than the first position-adjust-range permitted by the adjustment plate 13.

According to the arrangement described above, the positional adjustment of each joint 11 is conducted in two steps, namely, the positional adjustment step by the adjustment plate 13 and the positional adjustment step by the limit plate 14, such that the position-adjust range of each joint 11 becomes smaller. Accordingly, the joints 11 can be smoothly attached to the respective openings 23a-25a, improving the ease of the attachment of the joints 11. Further, it is possible to distribute a load which acts on, upon or after attachment of the joints 11, various portions that relate to the connection of the flow passages via the joints 11 in the horizontal direction, by contact of the joints 11 with the limit plate 14 located between the openings 23a-25a and the adjustment plate 13. Moreover, even where the position of the adjustment plate 13 deviates in the horizontal direction after the attachment of the joints 11, the position of each joint 11 can be comparatively largely adjusted relative to the adjustment plate 13, thereby reducing a load acting on the joints 11. Accordingly, various portions that relate to the connection of the flow passages are prevented from being deteriorated or deformed due to the undesirable load, thereby improving the reliability in the connection of the flow passages by the flow-passage connecting device 10.

In the present flow-passage connecting device 10, the adjustment plate 13, the limit plate 14, and the tapers 15t of the respective seal members 15 are disposed in this order from the posterior side of the joint attachment direction. As explained above, the taper 15t of each seal member 15 functions as a joint guide portion configured to guide the corresponding joint 11 while performing the positional adjustment of the joint 11 in the direction perpendicular to the horizontal direction when the joint 11 is attached. The range of the positional adjustment of each joint 11 which is permitted by the corresponding taper 15t is made larger than the above-described position-adjust range limited by the limit plate 14. Since the taper 11t is formed at the upper end of each joint 11, however, the outside diameter 15S of the extending portion 15b of each seal member 15 is made smaller than the diameter 14S of each through-hole 14x formed in the limit plate 14 and a difference between the outside diameter 11S of the joint 11 and the inside diameter 15tS (FIG. 3) of the taper 15t at its open end (the inside dimension of the extreme end of the seal member 15 remote from the head 20 in the direction opposite to the joint attachment direction) is made smaller than the position-adjust range limited by the limit plate 14. According to the arrangement, the joints 11 can be smoothly attached. Further, since the outside diameter 15S of the extending portion 15b of each seal member 15 is comparatively small, the taper 15t can be downsized and the openings 23a-25a at which the respective seal members 15 including the tapers 15t are disposed can be accordingly downsized. In the present flow-passage connecting device 10, the position-adjust range permitted by the adjustment plate 13, the position-adjust range limited by the limit plate 14, and the difference between the outside diameter 11S of each joint 11 and the inside diameter 15tS of the open end of each taper 15t are set so as to have a relationship represented by 4:2:1.

The taper 15t of each seal member 15 is inclined such that the corresponding passage 23-25 is gradually narrowed toward the anterior side of the joint attachment direction in a state in which the seal member 15 is disposed at the corresponding opening 23a-25a of the head 20, and the taper 11t formed at the upper end of each joint 11 is inclined in accordance with the inclination of the taper 15t, such that the taper 11t and the taper 15t correspond to each other. According to the arrangement, the joints 11 can be more smoothly attached. In the present flow-passage connecting device 10, only the upper end of each joint 11, namely, only the one end of each joint 11 at which the joint 11 is attached to the corresponding opening 23a-25a, is tapered. In place of the thus constructed joint 11, it is possible to employ a joint in which an entirety of a portion thereof between the upper end and the flange 11f is tapered.

The retain plate 12 functions as a joint-relative-position maintain portion configured to maintain the relative positional relationship among the three joints 11 in the direction perpendicular to the joint attachment direction when the joints 11 are attached. The retain plate 12 limits a change of the relative positional relationship among the three joints 11 in the horizontal direction, so that the three joints 11 can be smoothly attached substantially at the same time and various portions that relate to the connection of the flow passages are prevented from undergoing the undesirable load upon and after the attachment of the joints 11. A range within which the change of the above-indicated relative positional relationship is limited by the retain plate 12 coincides with a difference between the diameter 12S (the inside dimension) of each through-hole 12x formed in the retain plate 12 and the outside diameter 11S of each joint 11. This range is smaller than the above-described position-adjust range limited by the limit plate 14 and is smaller than the difference between the outside diameter 11S of each joint 11 and the inside diameter 15tS of the open end of each taper 15t. In the present flow-passage connecting device 10, where the difference between the outside diameter 11S of the joint 11 and the inside diameter 15tS of the open end of the taper 15t is represented by "1", the range within which the change of the relative positional relationship is limited by the retain plate 12 is set at "0.8".

As shown in FIG. 2, the joints 11 and the openings 31 of the sub tank 31 are connected by the respective elastic tubes 19, whereby errors in the dimensions and the locations of the joints 11 and the sub tank 31 can be accommodated by the elastic deformation amount of each tube 19. Accordingly, the level of accuracy in the dimensions and the locations required of the joints 11 and the sub tank 31 is lowered, and the undesirable load can be prevented from acting on various portions such as the joints 11, so that deterioration and deformation of various portions can be suppressed.

Figure 5:
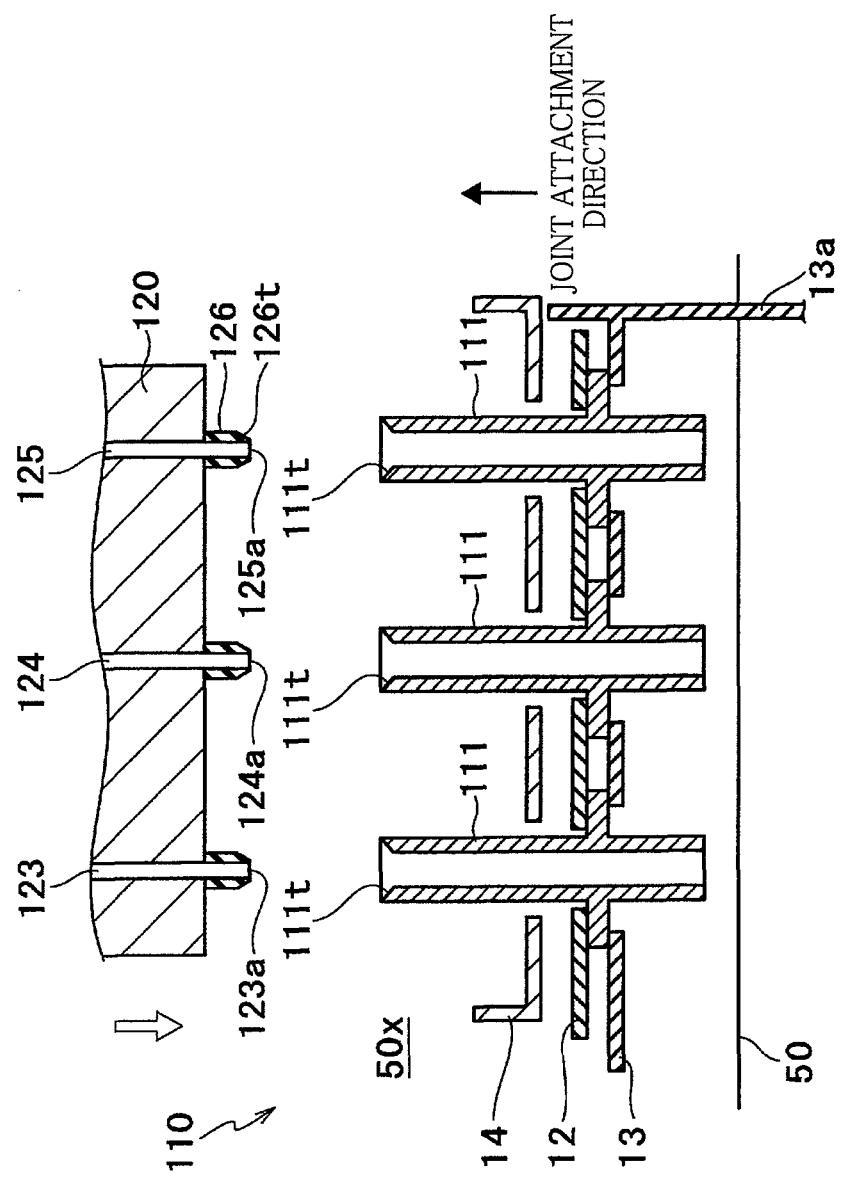
FIG. 5 is a view corresponding to FIG. 4B and showing a flow-passage connecting device according to another embodiment of the invention.

Referring next to FIG. 5, there will be described a flow-passage connecting device 110 according to another embodiment of the invention.

In the flow-passage connecting device 10 according to the illustrated embodiment, the joints 11 are inserted into the respective openings 23a-25a of the head 20. The flow-passage connecting device 110 according to the embodiment of FIG. 5 is identical in construction with the flow-passage connecting device 10 except that joints 111 cover respective portions of a head 120 at which are respectively formed openings 123a, 124a, 125a which are end portions of respective passages 123, 124, 125 of the head 120.

The openings 123a-125a of the head 120 are formed at lower ends of respective protruding portions 126 attached to the lower surface of the head 120 so as to correspond to the respective three passages 123-125. Each protruding portion 126 is a cylindrical member formed of an elastic material such as rubber. The lower open ends of the respective protruding portions 126 correspond to end portions of the respective passages 123-125. A taper 126t is formed around the entire periphery of the lower end of each protruding portion 126 at which the corresponding opening 123a-125a is formed. While the cylindrical wall of the protruding portion 126 has a substantially constant thickness, an outer circumferential portion of the cylindrical wall of the protruding portion 126 at the lower end is cut out, whereby the taper 126t is formed. A taper 111t is formed around the periphery of the upper end of each joint 111 by cutting out an inner circumferential portion of the cylindrical wall of the joint 111 at the upper end. The taper 111t of each joint 111 is guided by the corresponding taper 126t, so that the joints 111 can be smoothly attached to the respective openings 123a-125a.

In the thus constructed flow-passage connecting device 110, the sections of the head 120 at which the respective openings 123a-125a are formed are provided as the protruding portions 126 on which the upper ends of the respective joints 111 are fitted, whereby the head 120 can be downsized and the replacement workability of the head 120 can be enhanced.

While the embodiments of the invention have been described, it is to be understood that the invention is not limited to the details of those embodiments, but may be embodied with various changes and modifications, which may occur to those skilled in the art, without departing from the scope of the invention defined in the attached claims.

For instance, a taper for guiding the joint 11 such as an inclination similar to the taper 15t of the seal member 15 for guiding the joint 11 may be formed around the periphery of each through-hole 14x of the limit plate 14 shown in FIG. 3. In this arrangement, the operation of inserting the joints 11 into the respective through-holes 14x of the limit plate 14 shown in FIG. 4A can be smoothly conducted.

The configuration of each of the through-holes 12x, 13x, 14x respectively formed in the retain plate 12, the adjustment plate 13, and the limit plate 14 is not limited to the circular shape, but may be suitably changed. For instance, the through-hole formed in the limit plate may have a "C" shape or may have a shape in which a plurality of radial slits are formed so as to extend from the periphery of a circle.

The retain plate 12 may be eliminated.

In the illustrated embodiments, the three joints 11, 111 are independent of each other and the relative positional relationship in the horizontal direction is limited by the retain plate 12. The three joints 11, 111 may be made as an integral unit by connecting the flanges 11f of the joints 11 to each other, for instance. In this instance, the retain plate 12 is not required.

The number of the joints is not limited to three, but should be at least one.

The adjustment portion and the limit portion may not be necessarily provided by the plate member, but may be provided by a member having a certain thickness or size in the joint attachment direction.

The location of the adjustment portion is not particularly limited, but may be disposed on more anterior side in the joint attachment direction, as compared with the limit portion.

The adjustment portion may be constituted by an elastic member which is disposed at the end portions of the passages of the first member or at ends of the joints at which the joints are attached to the end portions of the passages and which is capable of accommodating, owing to the elastic deformation amount thereof, the errors in the dimensions and the locations of various portions that relate to the connection of the flow passages. In the illustrated embodiments, the adjustment portion is fixed to the printer main body via the frame 50. The adjustment portion may be fixed to a sub tank unit in which the sub tank 30, the elastic tubes 19, etc., are formed integrally with each other, without being fixed to the printer main body. In this instance, the connection of the sub tank unit and the head is simplified and the replacement of the sub tank unit is simplified.

In the illustrated embodiment, the taper 15t of each seal member 15 functions as the joint guide portion. The guide portion is not limited to the taper 15t, but may be otherwise embodied.

The shape of the one end of each joint at which the joint is attached to the end portion of the corresponding passage of first member is not limited to the tapered shape.

The joints may be attached in various ways, other than the procedure explained with reference to FIGS. 4A and 4B. For instance, it is not necessarily required to fix the limit plate 14 to the frame 50 in advance. In the illustrated embodiments, the head is fixed to the frame 50 after the adjustment plate 13 by which the joints is being held has been fixed to the frame 50. The joints may be attached to the head that has been fixed to the frame 50.

The members to which the joints are attached or connected are not limited to the head and the sub tank, but may be any two members in each of which the flow passages are formed. For instance, the two members may be the main tank and the head, the main tank and the sub tank, and so on.

In the illustrated embodiments, the openings 23a-25a of the head 20 are located at a height level slightly higher than that of the lower surface of the flow-passage unit 22, as shown in FIG. 2, namely, slightly higher than that of the ejection openings. The openings 23a-25a may be located at a height level substantially the same as or lower than the ejection openings. Where the openings 23a-25a of the head 20 are located higher than the ejection openings as in the illustrated embodiments, the ink is less likely to leak from the openings 23a-25a when the joints 11 are removed from the head 20.

An arbitrary member such as the seal member 15 in the illustrated embodiment may be interposed between the one end of each joint and the end portion of the corresponding passage of the first member.

The liquid ejecting apparatus according to the invention may be applicable to both of a line type and a serial type. The liquid ejecting apparatus of the invention is not limited to the printer, but may be applicable to a facsimile machine, a copying machine, and the like. Further, the liquid ejecting apparatus of the invention may be configured to eject a liquid other than the ink.

What is claimed is:

1. A flow-passage connecting device configured to connect a flow passage formed in a first member and a flow passage formed in a second member, comprising:
   a joint which is configured to be attached at one end thereof to an end portion of the flow passage of the first member and to be connected at the other end thereof to the flow passage of the second member and which has a hollow space through which a fluid flows between the one end and the other end;
   a joint support portion configured to support the joint when the joint is attached to the end portion of the flow passage of the first member, such that a positional adjustment of the joint in a direction perpendicular to a joint attachment direction in which the joint is attached to the end portion of the flow passage of the first member is permitted within a first position-adjust range; and
   a position-adjust-range limiting portion which is disposed distant from the end portion of the flow passage of the first member in a direction opposite to the joint attachment direction and which is configured to limit the positional adjustment of the joint in the direction perpendicular to the joint attachment direction within a second position-adjust range smaller than the first position-adjust range when the joint is attached,
   wherein the position-adjust-range limiting portion is a plate member which extends in the direction perpendicular to the joint attachment direction and in which is formed a through-hole through which the joint is insertable.

2. The flow-passage connecting device according to claim 1, wherein the joint support portion is a plate member which extends in the direction perpendicular to the joint attachment direction and in which is formed a through-hole through which the joint is insertable, the joint support portion being configured to support the joint in a state in which the joint is inserted through the through-hole.

3. The flow-passage connecting device according to claim 2, wherein the first position-adjust range coincides with a difference between an inside dimension of the through-hole and an outside dimension of the joint.

4. The flow-passage connecting device according to claim 1, wherein the second position-adjust range coincides with a difference between an inside dimension of the through-hole and an outside dimension of the joint.

5. The flow-passage connecting device according to claim 1, wherein at least a portion of the joint that includes the one end is tapered such that an outside dimension of the joint gradually decreases in the joint attachment direction.

6. The flow-passage connecting device according to claim 1, wherein the position-adjust-range limiting portion is located intermediate between the first member and the joint support portion in the joint attachment direction.

7. The flow-passage connecting device according to claim 1, wherein the first member is fixed to a base member, and
   wherein the position-adjust-range limiting portion is fixed in advance to the base member when the joint is attached.

8. The flow-passage connecting device according to claim 1, further comprising a joint guide portion which is disposed at the end portion of the flow passage of the first member and which is configured to guide the joint while performing the positional adjustment of the joint in the direction perpendicular to the joint attachment direction when the joint is attached to the end portion,
   wherein a range of the positional adjustment of the joint which is permitted by the joint guide portion is made larger than the second position-adjust range.

9. The flow-passage connecting device according to claim 8, wherein the joint guide portion into which the joint is fitted is tapered such that the flow passage is gradually narrowed in the joint attachment direction.

10. The flow-passage connecting device according to claim 9, wherein a difference between an outside dimension of the joint and an inside dimension of an extreme end of the end portion of the flow passage of the first member is made smaller than the second position-adjust range.

11. The flow-passage connecting device according to claim 9, wherein a portion of the joint that includes the one end is tapered such that the outside dimension of the joint gradually decreases in the joint attachment direction so as to correspond to the tapered joint guide portion.

12. The flow-passage connecting device according to claim 1, further comprising an elastic tube for connecting the other end of the joint and the flow passage of the second member.

13. The flow-passage connecting device according to claim 1, wherein a plurality of flow passages each as the flow passage are formed in the first member, and wherein the flow-passage connecting device includes a plurality of joints each of which functions as the joint and which respectively correspond to the plurality of flow passages.

14. The flow-passage connecting device according to claim 13, wherein the joint support portion is a single portion configured to support the plurality of joints such that the positional adjustment of each of the plurality of joints is permitted, and wherein the position-adjust-range limiting portion is a single portion configured to limit the positional adjustment of each of the plurality of joints.

15. The flow-passage connecting device according to claim 13, further comprising a joint-relative-position maintain portion configured to maintain a relative positional relationship among the plurality of joints in the direction perpendicular to the joint attachment direction when the plurality of joints are attached.

16. The flow-passage connecting device according to claim 15, wherein the joint-relative-position maintain portion is configured to limit a change of the relative positional relationship among the plurality of joints within a range smaller than the second position-adjust range.

17. The flow-passage connecting device according to claim 1, wherein the first member is a liquid ejecting head unit.

18. The flow-passage connecting device according to claim 17, wherein the joint is configured to cover a portion of the liquid ejecting head unit at which the end portion of the flow passage is formed.

19. A liquid ejecting apparatus, comprising:
a flow-passage connecting device defined in claim 1; and
a liquid ejecting head unit, as the first member, which is configured to eject, to a medium, a liquid supplied from the second member through the flow-passage connecting device.

* * * * *